UNITED STATES PATENT OFFICE.

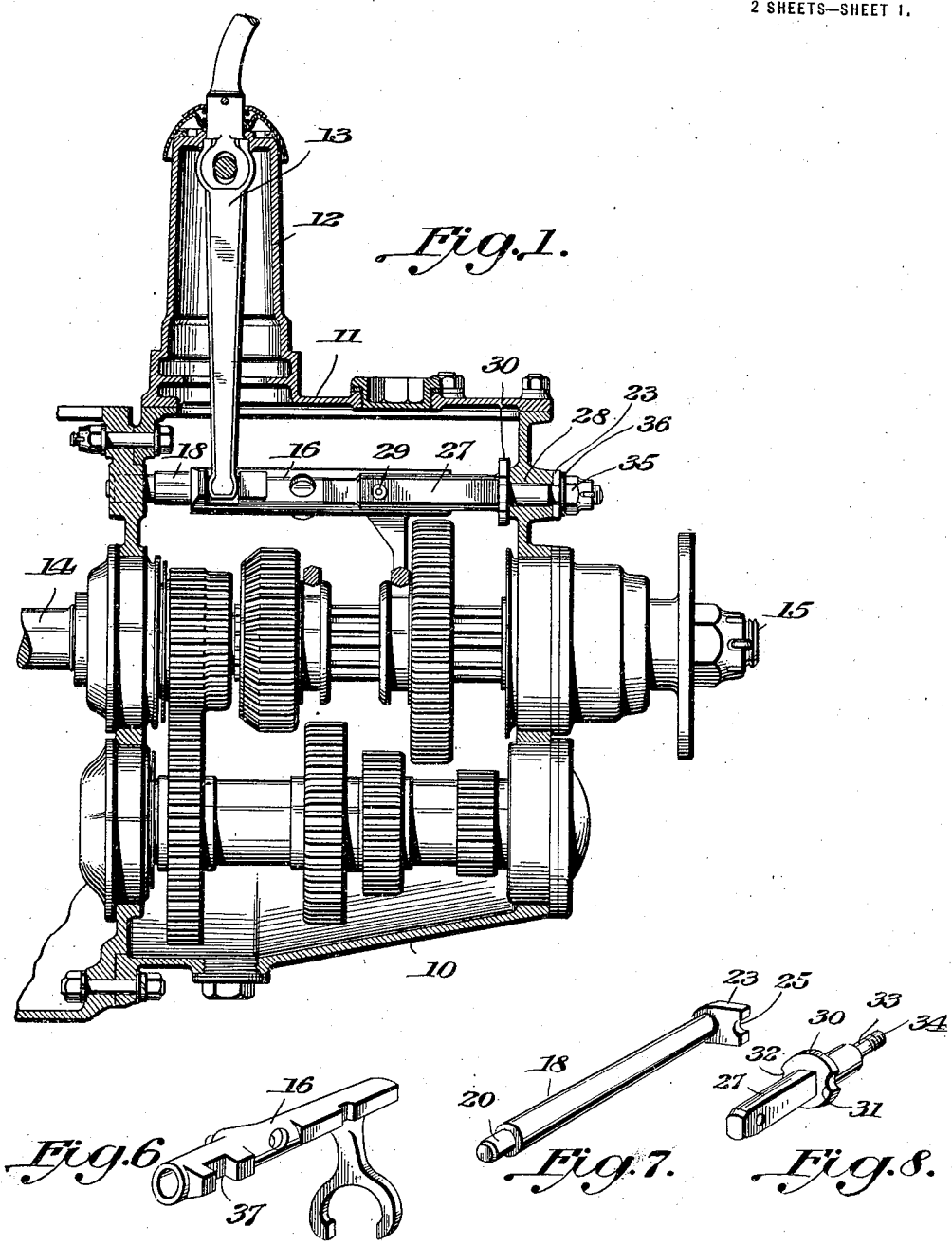

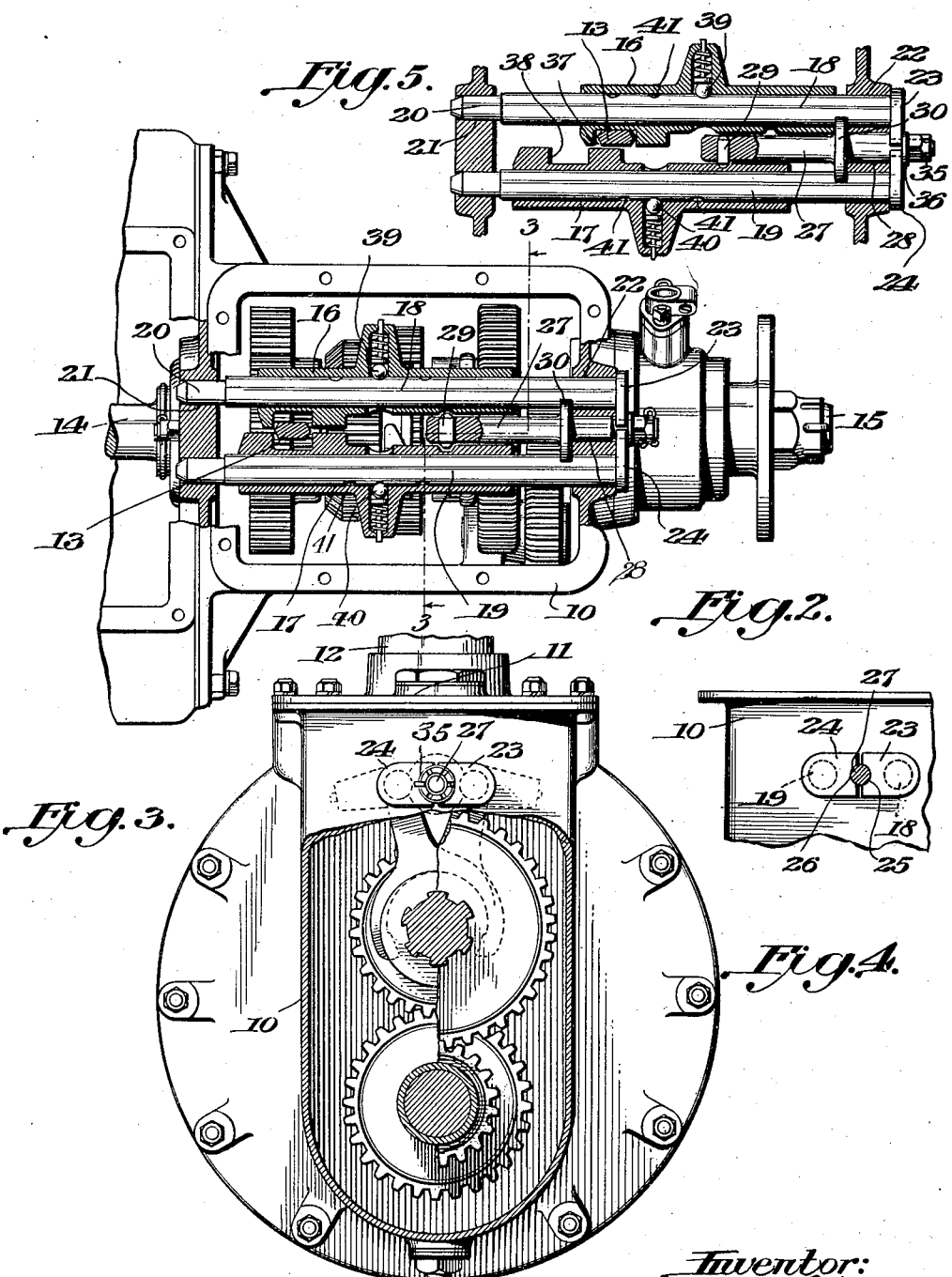

GEORGE L. McCAIN, OF DETROIT, MICHIGAN, ASSIGNOR TO PACKARD MOTOR CAR COMPANY, OF DETROIT, MICHIGAN, A CORPORATION OF MICHIGAN.

CHANGE-GEAR TRANSMISSION.

1,356,641.  Specification of Letters Patent.  Patented Oct. 26, 1920.

Application filed September 15, 1917. Serial No. 191,587.

*To all whom it may concern:*

Be it known that I, GEORGE L. McCAIN, a citizen of the United States, and residing at Detroit, Wayne county, State of Michigan, have invented certain new and useful Improvements in Change-Gear Transmission, of which the following is a specification.

This invention relates to motor vehicles and more particularly to a change gear transmission or gear set. The principal object of the invention is to provide an improved arrangement of the gear shifting mechanism supporting rods and means for removably securing them in place. Other objects and features of novelty will be apparent from the description taken in connection with the drawings, in which:—

Figure 1 is a longitudinal sectional elevation through a gear set embodying the features of the present invention;

Fig. 2 is a plan view of the gear set with the top cover removed and certain parts being shown in section;

Fig. 3 is a transverse sectional view taken substantially on the line 3—3 of Fig. 2;

Fig. 4 is a detailed view showing the ends of the supporting rods, the detent rod between the supporting rods being shown in section;

Fig. 5 is a detailed plan view of the supporting and detent rods, the shifter sleeves being shown in section;

Fig. 6 is a perspective view of one of the shifter sleeves with its attached gear shifting fork;

Fig. 7 is a perspective view of one of the supporting rods; and

Fig. 8 is a perspective view of the detent rod.

Referring to the drawings the transmission or gear set casing 10 has a removable top cover 11 carrying a support 12 for the shifter lever 13. For the purpose of connecting the driving shaft 14 to the driven shaft 15 at any one of a plurality of angular velocity ratios, change speed gearing of any desired type is arranged within the casing 10. Means for shifting the gears so as to obtain the desired angular velocity ratios between the driving and driven shafts includes two shifter sleeves 16 and 17 slidably mounted on two supporting rods 18 and 19 respectively, these parts being arranged above the gears and directly under the removable top cover 11. The rods 18 and 19 are removably mounted in the casing and to this end the rod 18 is formed with a reduced end 20 which is seated in a bore 21 formed in the front wall of the casing. The other end of the rod projects through a bore 22 formed in the rear wall of the casing and in alinement with the bore 21. The projecting end of the rod is formed with a flange 23, which extends toward the other rod 19. This latter rod is similar to the rod 18 except that the projecting end is provided with a flange 24 which extends toward the rod 18. The adjacent edges of the flanges 23 and 24 are formed with semicircular recesses 25 and 26 respectively which receive the projecting end of the detent rod 27. As clearly shown in the drawings, this detent rod is mounted in a bore 28 formed in the rear wall of the casing between the rods 18 and 19 and has a portion extending within the casing which carries the detent 29 adapted to coöperate with the sleeves 16 and 17 to prevent the displacement of one sleeve while the other is being shifted. A flange 30 is provided on the detent rod and is formed with two diametrically opposite arcuate recesses or notches 31 and 32, the recess 31 receiving the rod 19 and the recess 32 the rod 18. In this manner rotation of the detent rod is prevented. Outside the casing the detent rod is reduced and has the portion 33 seating in the recesses 25 and 26 formed in the flanges 23 and 24, and the threaded end 34. The nut 35 is mounted on this threaded end and the washer 36 is mounted between the nut and the flanges 23 and 24. Thus the nut 35 acts to secure all the rods in place. The sleeves 16 and 17 may be of any approved form and are shown as formed with the recesses 37 and 38 adapted to receive the end of the shifting lever 13 for the purpose of actuating the same and also provided with the latches 39 and 40 respectively, which coact with notches 41 formed in the supporting rods to yieldingly secure the sleeves in adjusted position.

From the foregoing description it will be seen that if for any reason it is desired to get at the gears of the transmission, it is merely necessary to remove the cover 11 and the nut 35. Then the supporting rods 18 and 19 may be withdrawn from the casing freeing the shifter sleeves 16 and 17, so that they may be removed. Finally, the detent rod may be moved inwardly to demount it from its support in the rear wall of the casing.

It will be observed that according to this invention a single means is provided for securing all the rods in place in the casing, and consequently, the shifting mechanism may be removed very easily and with a minimum amount of labor. Furthermore, the rod 27 performs the double function of locking all the rods in place and acting as a detent.

Although a preferred embodiment of the invention has been described specifically, it is understood that the details thereof may be varied within the scope of the appended claims without departing from the spirit of the invention.

Having thus described the invention what is claimed as new and desired to be secured by Letters Patent is:—

1. The combination with a gear set casing and means for shifting the gears therein, of supporting rods for the shifting means, said rods being removably mounted in the casing and a single means disposed between said rods for securing the rods in place.

2. The combination with a gear set casing and means for shifting the gears therein, of supporting rods for the shifting means, said rods being removably mounted in alined bores in two opposite walls of the casing and projecting from one wall, and a single means coacting with the projecting ends to secure the rods in place.

3. The combination with a gear set casing and means for shifting the gears therein, of supporting rods for the shifting means, said rods being removably mounted in alined bores in two opposite walls of the casing and projecting from one wall, the projecting end of each rod having a lateral projection and a single means coacting with said projections to secure the rods in place.

4. The combination with a gear set casing and means for shifting the gears therein, of supporting rods for the shifting means, said rods being removably mounted in alined bores in two opposite walls of the casing and projecting from one wall, the projecting end of each rod having a lateral projection, a threaded rod carried by the last mentioned wall and a nut on said rod arranged to clamp the said projections against the said wall.

5. The combination with a gear set casing and means for shifting the gears therein, of a pair of supporting rods for the shifting means, a detent rod between said supporting rods, all of said rods being removably mounted in the casing, and means on the detent rod for securing the supporting rods in place.

6. The combination with a gear set casing and means for shifting the gears therein, of a pair of supporting rods for the shifting means, a detent rod between said supporting rods, all of said rods being removably mounted in the casing, and means on the detent rod for securing all the rods in place.

7. The combination with a gear set casing and means for shifting the gears therein, of a pair of supporting rods for the shifting means, a detent rod between said supporting rods, the supporting rods being withdrawable from the outside of the casing, and the detent rod from the inside of the casing, and means on the detent rod for securing the supporting rods in place.

8. The combination with a gear set casing and means for shifting the gears therein, of a pair of supporting rods for the shifting means, a detent rod between said supporting rods, the supporting rods being withdrawable from the outside of the casing, and the detent rod from the inside of the casing, and means on the detent rod outside the casing coacting with the ends of the supporting rods for securing the latter in place.

9. The combination with a gear set casing and means for shifting the gears therein, of a pair of supporting rods for the shifting means, a detent rod between said supporting rods, the supporting rods being withdrawable from the outside of the casing, and the detent rod from the inside of the casing, and a nut on the end of the detent rod outside the casing coacting with the ends of the supporting rods for securing the latter in place.

10. The combination with a casing, a pair of rods mounted in alined bores in two opposite walls thereof, each of said rods having a transverse flange outside the casing in contact with one wall, a detent rod mounted in the last mentioned wall between the supporting rods and having a threaded stem projecting outside the wall and a flange on the inside thereof, and a nut on the said stem for clamping all the rods against the said wall.

11. The combination with a casing, of a plurality of rods removably mounted in said casing, and a single means for securing said rods against longitudinal displacement and rotation.

12. The combination with a casing of a plurality of rods removably mounted in said casing, a threaded member carried by the casing and a nut on said member engaging said rods to secure them in place.

13. In combination with a gear set casing, a detent rod carried by the casing having a flange formed with a pair of recesses, a pair of rods removably mounted in said casing, each engaging in one of said recesses whereby the detent rod is held against rotation, and means for securing said rods in place.

14. In combination with a gear set casing, a detent rod carried by the casing having a flange formed with a pair of recesses, a pair of rods removably mounted in said casing, each engaging in one of said recesses whereby the detent rod is held against rotation, and means on said detent rod for securing the other rods in place.

15. The combination with a casing, of a plurality of rods removably mounted in said casing, and means on one of the rods for locking all the rods in place.

16. The combination with a gear set casing and means for shifting the gears therein, of supporting rods for the shifting means, detent means for controlling the displacement of parts of the shifting means, and means associated with said detent means for locking said supporting rods in place.

17. In combination with a gear set casing, means for shifting the gears including supporting rods, a gear shifting sleeve slidable on each rod, a detent rod having means to lock one sleeve against movement when another is shifted and also having means for securing said supporting rods in place.

18. In combination with a gear set casing, means for shifting the gears including supporting rods, a gear shifting sleeve slidable on each rod, a detent rod having means to lock one sleeve against movement when another is shifted and also having means for securing all said rods in place.

19. In combination with a gear set casing, means for shifting the gears including supporting means, gear shifting sleeves slidbaly mounted on said supporting means, and a single device having means to lock one sleeve against movement when another is shifted and also having means for securing said supporting means in place.

In testimony whereof I affix my signature.

GEORGE L. McCAIN.